June 12, 1934.  G. L. ROBERTS  1,962,939
BRAKE
Filed Feb. 9, 1933   2 Sheets-Sheet 1

INVENTOR
G. L. ROBERTS
By Hazard & Miller
ATTORNEYS

June 12, 1934.     G. L. ROBERTS     1,962,939
BRAKE
Filed Feb. 9, 1933     2 Sheets-Sheet 2

INVENTOR
G L ROBERTS
By Hazard & Miller
ATTORNEYS

Patented June 12, 1934

1,962,939

UNITED STATES PATENT OFFICE 1,962,939

BRAKE

Glen L. Roberts, Glendale, Calif.

Application February 9, 1933, Serial No. 655,906

7 Claims. (Cl. 188—78)

My invention relates to a brake adaptable mainly for a motor vehicle and is of a type in which a cam action is utilized to wedge or force the brake lining in contact with the brake drum.

An object and feature of my invention is a brake in which a plurality of segmental brake shoes, each with a lining, is mounted and supported to have a radial movement. These shoes are moved outwardly in a radial direction by means of a cam. The cam is provided with a plurality of cam shaped surfaces, one for each brake shoe, and on rotation of the cam in respect to the shoes the interengagement between the cam surfaces and shoes forces such shoes outwardly to bring the lining into frictional engagement with the interior of the brake drum.

In this construction another object and feature of my invention is employing a circular or ring like cam which surrounds the axle and is supported preferably from the same stationary structure on which the brake shoes are mounted. This circular cam is actuated preferably by means of a pinion and gear teeth to give the cam a slight rotational movement for applying the brake.

Another detail feature of my invention relates to the connection between a lever exterior to the brake housing, which is actuated by the brake rods or the like. This lever actuates a shaft for rotating the pinion.

Another detailed feature of my invention relating to the interconnection between the brake applying arm or lever and the pinion is an adjustable connection by which the brake arm may be reset as regards the pinion and thus the ring like cam may be rotated to take up wear in the brake lining and thus provide for adjusting the shoes relatively to the circular cam in accordance with the wear on the lining.

Another feature of my invention is a brake having a plurality of radially movable shoes, a circular cam with a plurality of cam surfaces for moving a number of such shoes, and also one or more additional brake shoes which may be actuated through a link and lever system and thus provide an emergency brake acting on the brake drum.

My invention is illustrated in connection with the accompanying drawings, in which:

Fig. 4 is a detail tranverse section on the line 4—4 of Figure 1 in the direction of the arrows, showing the guide and supporting lugs for the brake shoe.

Fig. 5 is a transverse section on the line 5—5 of Figure 1 in the direction of the arrows, showing a resilient pressure mounting for the brake shoes.

Figure 1:
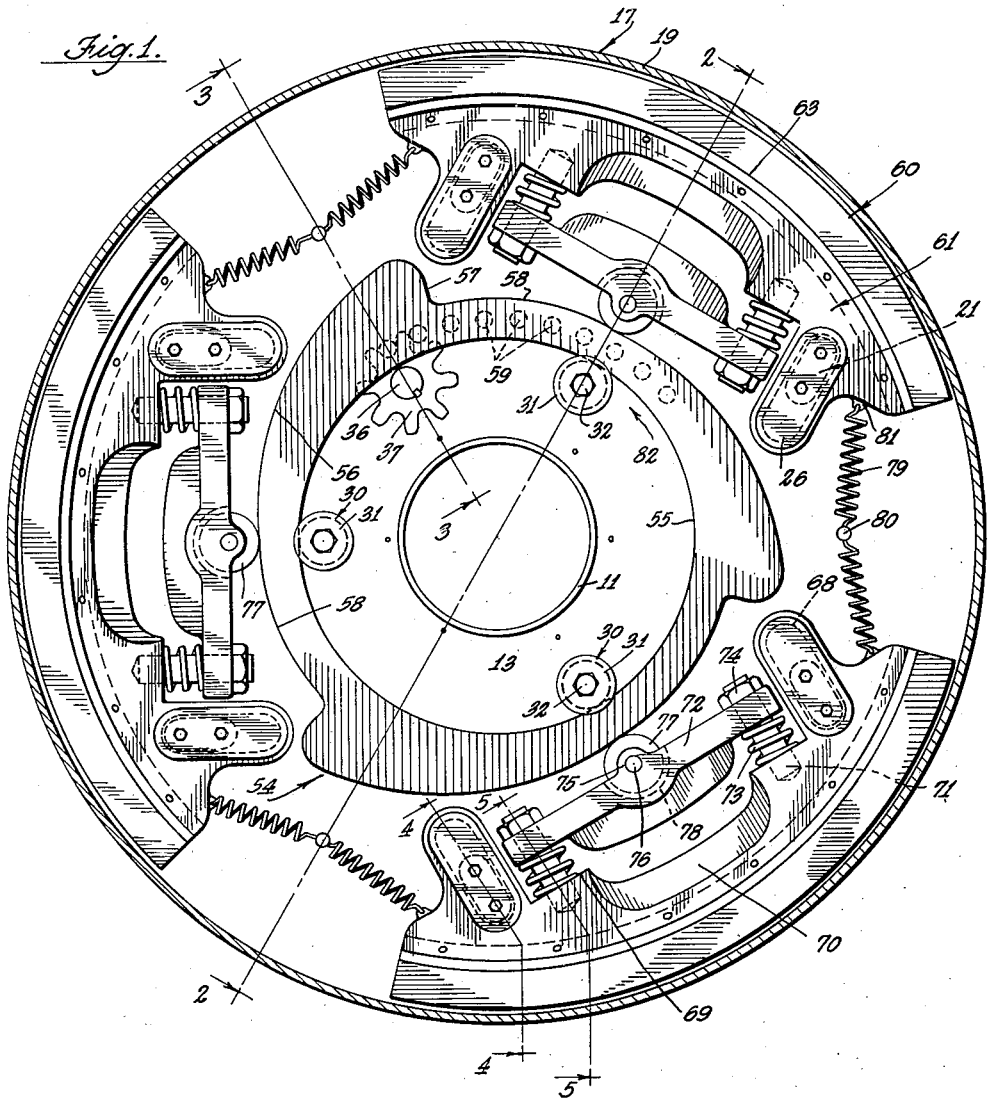
Fig. 1 is a vertical longitudinal section taken on the line 1—1 of Figure 2 in the direction of the arrows.
Figure 2:
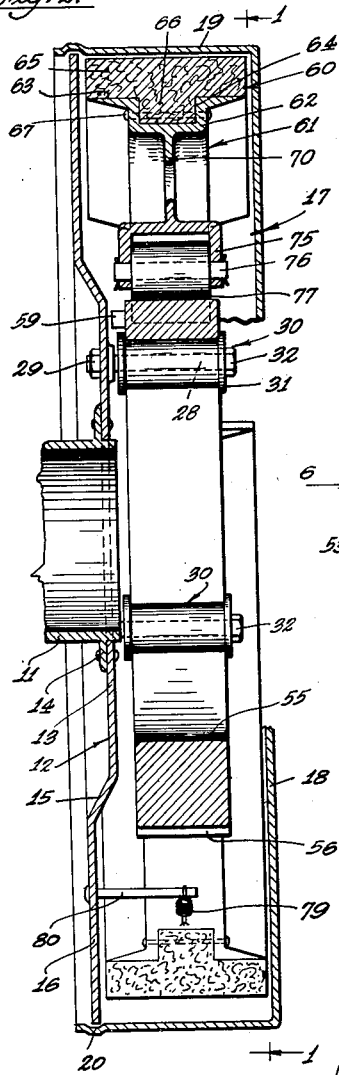
Fig. 2 is a transverse diametrical section on the line 2—2 of Figure 1 in the direction of the arrows.

In the illustrations an axle housing or fixed structure is indicated at 11 and this has a disc 12 connected thereto. The disc has a center section 13 riveted to a flange 14 on the axle housing. It is provided with an offset section 15 and an outer section 16. The brake drum 17 has a disc like section 18 attached to a wheel and a peripheral cylindrical section 19 on which the shoes bear. A slight groove 20 accommodates the periphery of the outer section 16 of the disc 12.

Mounted on the disc 12 there are a plurality of supporting and bearing studs 21. These have an enlarged base section 22 secured by screws 23 to the disc 12. Each of these is provided with a reduced bearing section 24, there being a shoulder 25 connecting the sections 22 and 24. A cover plate 26 is secured to the outer end of the bearing section 24 by screws 27. Also attached to the inner portion 13 of the disc 12 there are a plurality of stationary axle studs 28, these being secured by nuts 29, and on each stud there is a roller 30, each roller having a flange 31 and being held on the axle by a retaining nut 32.

Figure 3:
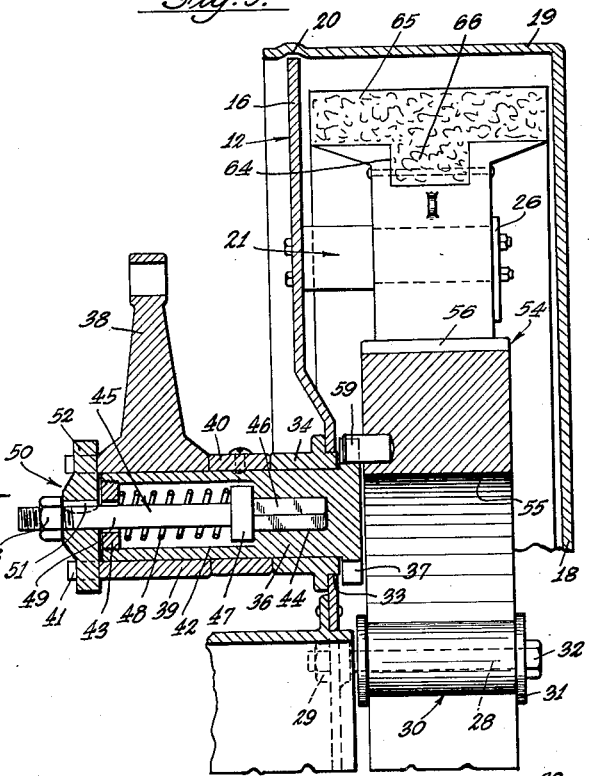
Fig. 3 is a transverse radial section on the line 3—3 of Figure 1 in the direction of the arrows, on a scale enlarged over that of Figures 1 and 2.
Figure 6:
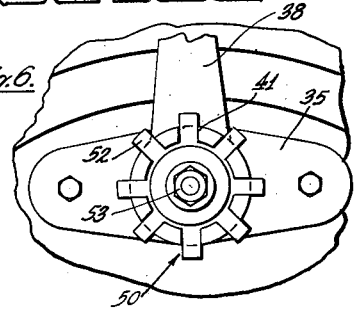
Fig. 6 is an end elevation taken in the direction of the arrow 6 of Figure 3, showing the adjustment of the brake arm.

The disc 12 is also provided in the portion 13 with an opening 33 (note Figure 3) and in this opening there is fitted a sleeve 34. This sleeve has flanges 35 for bolting to the section 13 of the disc. Rotatably mounted inside this sleeve 34 there is a pinion shaft 36 having a pinion 37 inside of the brake housing, that is between the disc 12 and the brake shoe disc 18. A brake actuating arm 38 has a hub 39, the hub being rotatable on the pinion shaft 36. The hub is spaced from the sleeve 34 by a collar 40. The outer portion of the hub 39 is provided with a series of slots 41, these being equally spaced around the hub. The shaft 36 has a cylindrical recess 42 in which there is a threaded plug 43 at the outer end. Extending inwardly from the recess 42 there is a squared socket 44. An adjusting rod 45 has a square end 46 fitting in the squared socket 44. A shoulder 47 bears against the base of the recess 42. A coil compression spring 48 surrounds the stem portion 49 of the bolt and bears against the plug 43 and the shoulder 47, thus keeping the squared end 46 seated in the socket 44. A spider washer 50 is secured by a key 51 on the stem 49 of the bolt 45 and has radial fingers 52, these fingers engaging in the slots 41 of the hub 39. A nut 53 holds the washer in place.

This construction is used to hold the brake arm 38 in desired position and relation to the pinion shaft 36. By pulling the washer with the bolt outwardly against the compression spring 48, the fingers 52 may be drawn out of the slots 41 in the hub of the arm 38 and thus allow this arm to be rotated relatively to the bolt 45 and hence to the shaft 36, the squared end of the bolt being designed so that it is not withdrawn from the squared socket 44.

The circular or ring like cam designated by the assembly numeral 54 (note Figure 1) has a cylindrical inside surface 55 resting on the three rollers 30, each of these rollers having a flange 31 to form a guide for the ring. The cam ring is illustrated as having three cam surfaces 56 with abrupt shoulders 57. The section 58 adjacent each shoulder is concentric with the inner surface 55 of the cam ring. The cam ring is provided with a plurality of teeth 59, which are made in the form of laterally projecting cylindrical studs, these studs engaging the teeth of the pinion 37.

Each brake shoe assembly 60 is provided with an outer shoe block 61. Each shoe block has a radial web 62 and a peripheral face 63, and in such face there is a radial and partly peripheral slot 64. The brake lining 65 has a tongue 66 fitting in the peripheral slot 64 and secured therein by transverse pins 67. Each web is illustrated as provided with a pair of slots 68, these slots accommodating the bearing end 24 of the fixed studs 21. The shoulders 25 of these studs are wider than the slots 68 thus properly centering the webs, and also the plates 26 are wider than the slots, therefore, holding the brake shoe webs in proper adjusted position. Each brake shoe web has a pair of flat shoulders 69 connected by a recessed section 70 and in each shoulder there is threaded a bolt 71. On each bolt there is a bridging bar 72. Compression spring 73 surrounds each bolt and presses the bridging bar outwardly against the head 74 of the bolts. Each bridging bar is provided with a pair of ears 75 through which extends an axle 76 on which is journaled a roller 77. Each bridging bar has a recess 78 to accommodate the roller. These rollers each bear on a cam surface 58 of the ring like cam 54. Retraction springs 79 are attached to fixed pins 80 on the disc 13 and at their opposite ends 81 to the ends of the webs of the brake shoes.

The manner of operation and functioning of the brake of Figures 1 through 6 is as follows: The springs 73 are designed so as to space each bridging bar 72 a proper distance from the brake shoe web whereby the retraction springs 78 may withdraw the lining from contact with the cylindrical section of the brake drum. The position of the circular cam 54 is adjusted by rotating the pinion shaft 36 in relation to the brake arm 38, as above described, through the medium of the spider washer 50 to contact the rollers 77 with the low or initial portion of each cam surface 58. Then when the brake arm 38 is rocked for applying the brakes, the pinion 37 is rotated in the desired direction to move the circular cam 54 in the direction of the arrow 82. This causes the rollers 77 to be pressed outwardly and through the medium of the bridging bars 72 and the compression spring 73 the webs and the outer portion of the brake shoes with the brake lining are forced radially outwardly, the lining contacting with the inside of the cylindrical section of the brake drum. On account of having the bridging bar forming the pressure connection in the brake shoes, these shoes may rock slightly peripherally of the cylindrical section of the brake drum should such section not to be a true cylinder and thereby bring a more even bearing of the brake lining against the brake drum. The wedging action of the circular cam 54 forces all of the brake shoes out with an even pressure so that as in the construction illustrated there is an even outward radial pressure exerted against the cylindrical section of the brake drum. Each brake shoe is held from a circular movement with the drum due to the mounting on the stationary studs 21, which allow a radial movement of each brake shoe but prevent a rotational movement of the shoe.

When the brake arm 38 is released to release the brakes, such arm is retracted by a retraction spring or the like, which is common to brake applying mechanisms. This action gives a reverse rotation to the pinion 37 and a rotation of the cam ring 54 in a direction reverse to the arrow 82, which action allows the retraction springs 78 to withdraw the brake shoes radially inwardly and move the lining out of contact with the cylindrical section of the drum.

Figure 7:
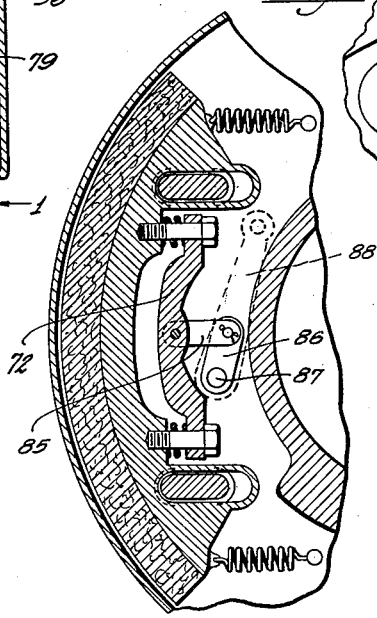
Fig. 7 is a section similar to Figure 1, showing a modified construction for actuating the brake shoes, adapted for use in an emergency brake.

In the construction of Figure 7 for emergency brake operation, the brake shoe mounting and assembly is the same as above described. In this arrangement, however, the bridging bar 72 has a center link 85 connected thereto. This link is connected to a short lever 86 inside of the brake housing. A rock shaft 87, to which this lever is attached, extends through the disc 12 and has a bearing therein. The outside end of this rock shaft 87 has a brake arm 88 connected thereto, which arm is connected to the emergency brake lever in any suitable manner.

Therefore, in the construction of Figure 7 when the emergency brake is applied the arm 88, the rock shaft 87, and the lever 86, are rocked in such a direction as to exert a pressure on the link 85, this link forcing the bridging bar 72, and hence the brake shoe assembly as a whole, radially outwardly; and thus the brake lining is brought into engagement with the cylindrical section of the brake drum.

By my construction each brake shoe is somewhat loosely mounted on a pair of studs to have an outward and inward radial movement. On account of the outward pressure being exerted through the bridging bars, the shoes are free to tilt in a peripheral direction should the brake drum not be a true cylinder. Also, the brake shoes can rock slightly laterally, that is, on the studs, should the brake shoe be slightly coned. Thus the brake shoes may be accommodated to brake drums which are not true cylinders either in the original manufacture or become worn to be out of true. While I have illustrated the circular cam as being supported on a plurality of rollers forming bearings, it is obvious that other types of bearings may be used for this circular cam, the necessary condition being that the circular cam when rotated will rotate concentrically to the axis of the brake drum.

Various changes may be made in the details of construction without departing from the spirit or scope of the invention as defined by the appended claims.

I claim:

1. A brake having a rotatable brake drum with a cylindrical section, a fixed structure having a disc, the center of the disc being concentric with the drum, a plurality of pairs of studs secured to the disc, a brake shoe slidably mounted on each pair of studs for radial movement, a bearing structure on the disc, a circular cam mounted thereon, said cam having a plurality of cam surfaces, interengaging means between the brake shoes and the cam surfaces, means to partially rotate the cam and thereby force the brake shoes into contact with the brake drum, the interengaging means between the brake shoes and the cams comprising a roller mounted on a bridging bar for each brake shoe, the bridging bar having a resilient mounting on the remaining portion of the brake shoe to permit slight adjustment of the brake shoe in relation to the brake drum.

2. In a brake having a rotatable brake drum, a fixed structure having a plurality of pairs of studs projecting therefrom, a brake shoe slidably mounted on each pair for radial movement in reference to the drum, each brake shoe having a bridging bar resiliently mounted thereon, and means to exert a pressure on each bridging bar for forcing the brake shoes radially outwardly.

3. In a brake as claimed in claim 2, the mounting for the bridging bar comprising a pair of bolts, the ends of the bars being mounted on the bolts, the shoe having a web, and springs on the bolts between the web and the bridging bar.

4. In a brake having a fixed structure, a rotatable brake drum operating concentric therewith, a plurality of parallel studs projecting from the fixed structure, a brake shoe having a pair of slots longer than the length of the studs, a lining secured to the periphery of the shoe, a retracting means for the shoe, and means to press the shoe in a radial direction to contact the lining and the drum, a bridging bar having a pair of bolts extending therethrough and secured to the shoe, a spring on each bolt between the bridging bar and the shoe, the means to press the shoe having an operating engagement with said bridging bar.

5. A brake comprising, in combination, a rotatable brake drum, a fixed structure concentric with the drum, a bearing means concentric with said drum, a circular cam rotatably mounted on the bearing means, said cam having a plurality of cam surfaces, a plurality of pairs of studs secured to the fixed structure, a brake shoe having a pair of slots mounted on each pair of studs, an interengaging means between the cam surfaces and the brake shoes to force said shoes outwardly, an additional brake shoe mounted on a pair of studs, and means extending through said fixed structure and independent of the cam ring to force said additional brake shoe outwardly.

6. In a brake, a brake drum, a fixed structure having a pair of studs extending outwardly therefrom, a brake shoe having a web with a pair of slots, a stud extending through each slot, a lining on the periphery of the web, a pair of bolts secured to the web, a bridging bar slidably mounted on said bolts, a spring means to urge the bridging bar away from the web, a link connected to the bridging bar, and a rock shaft extending through the fixed structure and having a lever to operate said link.

7. A brake having a rotatable brake drum with a cylindrical surface, a relatively fixed structure having a bearing, a circular cam mounted thereon and having a plurality of cam surfaces, brake shoes with interengaging means to engage the cam surfaces, the said shoes being movable to contact the drum, a rotatable shaft extending through the fixed structure and having a geared connection with the circular cam to partly rotate the cam, the shaft having a recess with a squared socket, a bolt extending through the recess and having a squared end fitting in the socket, said bolt being slidable, a washer with radial fingers fixedly mounted on the bolt, and a brake arm rotatably mounted on the shaft and having a series of slots engageable by the said fingers for adjusting the brake arm relative to the shaft and hence for adjusting the cams in reference to the brake shoes.

GLEN L. ROBERTS.